US 6,688,414 B1

(12) United States Patent
Bruno

(10) Patent No.: US 6,688,414 B1
(45) Date of Patent: Feb. 10, 2004

(54) ALL-TERRAIN VEHICLE

(76) Inventor: Michael Bruno, 1779 MC Creight Rd., Shelocta, PA (US) 15774

( * ) Notice: Subject to any disclaimer, the term of this patent is extended or adjusted under 35 U.S.C. 154(b) by 65 days.

(21) Appl. No.: 10/056,522

(22) Filed: Jan. 25, 2002

(51) Int. Cl.[7] .............................................. B60K 17/00
(52) U.S. Cl. ...................... 180/233; 180/65.1; 180/907; 280/32.5
(58) Field of Search ................. 180/233, 244, 180/907; 414/537; 280/32.5; 296/120.1, 121

(56) References Cited

U.S. PATENT DOCUMENTS

| | | | | |
|---|---|---|---|---|
| 3,204,791 A | * | 9/1965 | Williams ..................... 414/537 |
| 3,572,821 A | * | 3/1971 | Van Antwerp ......... 296/100.02 |
| 3,874,527 A | * | 4/1975 | Royce ......................... 414/537 |
| 3,921,740 A | * | 11/1975 | Forster ....................... 180/213 |
| 3,933,258 A | * | 1/1976 | Forsyth et al. .............. 414/537 |
| 4,044,850 A | | 8/1977 | Winsor |
| 4,199,036 A | | 4/1980 | Wereb |
| 4,518,057 A | * | 5/1985 | McCallum .................. 180/210 |
| 4,687,068 A | | 8/1987 | Pagett |
| 4,700,989 A | * | 10/1987 | Ercilla ........................ 297/331 |
| 4,717,193 A | * | 1/1988 | Noriega ..................... 296/37.7 |
| 4,823,895 A | * | 4/1989 | Kimball ..................... 180/6.48 |
| 5,137,413 A | * | 8/1992 | Ressler ....................... 414/474 |
| 5,380,144 A | * | 1/1995 | Smith et al. ................ 414/537 |
| 5,431,524 A | * | 7/1995 | Antal et al. ................. 414/537 |
| 5,499,694 A | * | 3/1996 | Dorn .......................... 187/200 |
| 5,518,081 A | | 5/1996 | Thibodeau |
| 5,890,757 A | * | 4/1999 | Masterson et al. ..... 296/100.02 |
| 6,071,064 A | * | 6/2000 | Hackett ...................... 414/545 |
| 6,076,619 A | | 6/2000 | Hammer |
| 6,095,269 A | | 8/2000 | Hosaka et al. |
| 6,105,696 A | * | 8/2000 | Chen ......................... 180/65.1 |
| 6,133,856 A | * | 10/2000 | McCauley .................. 340/936 |
| 6,419,036 B1 | * | 7/2002 | Miglia ......................... 180/9.1 |
| 6,447,040 B1 | * | 9/2002 | Young, Sr. ................... 296/61 |

* cited by examiner

*Primary Examiner*—Brian L. Johnson
*Assistant Examiner*—Christopher Bottorff

(57) ABSTRACT

A all-terrain vehicle for allowing users with limited physical capabilities to participate in off-road activities. The all-terrain vehicle includes a housing having a bottom wall, a back wall, and a pair of side walls. A front panel extends between a lower portion of each of the side walls. A floor panel is positioned above the bottom wall. Brackets are attached to the back and side walls. A door is hingably coupled to the top edge of the front panel. Linkage members are attached to the housing and the door. A front drive system and a rear drive system for the purpose of propulsion are fixedly coupled to the bottom wall and positioned adjacent front and rear sections of the bottom wall respectively. A seat is releasably attachable to the floor. A cover member is selectively couplable to the upper rear portion of the housing. Plates are fixedly coupled to a lower section of the cover member for coupling to the bracket members.

16 Claims, 3 Drawing Sheets

ALL-TERRAIN VEHICLE

BACKGROUND OF THE INVENTION

1. Field of the Invention

The present invention relates to all-terrain vehicles and more particularly pertains to a new all-terrain vehicle for allowing users with limited physical capabilities to participate in off-road activities.

2. Description of the Prior Art

The use of all-terrain vehicles is known in the prior art. U.S. Pat. No. 5,518,081 describes a all-terrain all-weather wheelchair. Another type of all-terrain vehicles is U.S. Pat. No. 6,076,619 is a all-terrain vehicle for disabled persons.

While these devices fulfill their respective, particular objectives and requirements, the need remains for a vehicle that is designed for partially disabled people along with those in wheelchairs.

SUMMARY OF THE INVENTION

The present invention meets the needs presented above by providing a removable seat and a ramp so that a wheelchair can load into the vehicle.

Still yet another object of the present invention is to provide a new all-terrain vehicle that electrically powered making it quiet and reliable.

To this end, the present invention generally comprises a housing having a bottom wall, a back wall, and a pair of side walls. A front panel extends between a lower portion of each of the side walls. A floor panel is positioned above the bottom wall. Brackets are attached to the back and side walls. A door is hingably coupled to the top edge of the front panel. Linkage members are attached to the housing and the door.

A front drive system and a rear drive system for the purpose of propulsion are fixedly coupled to the bottom wall and positioned adjacent front and rear sections of the bottom wall respectively. A seat is releasably attachable to the floor. A cover member is selectively couplable to the upper rear portion of the housing. Plates are fixedly coupled to a lower section of the cover member for coupling to the bracket members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
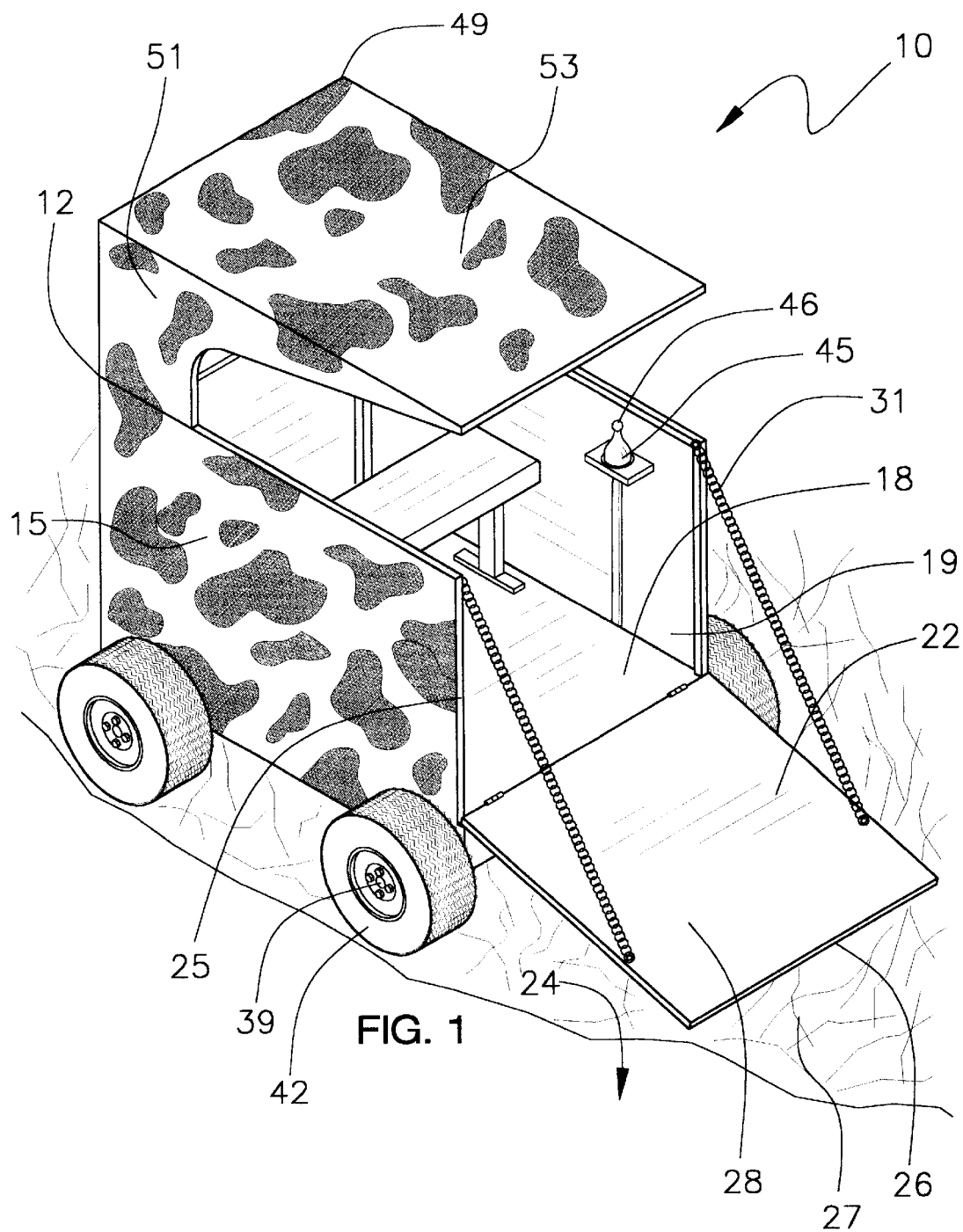
FIG. 1 is a schematic perspective view of a new all-terrain vehicle according to the present invention.
Figure 2:
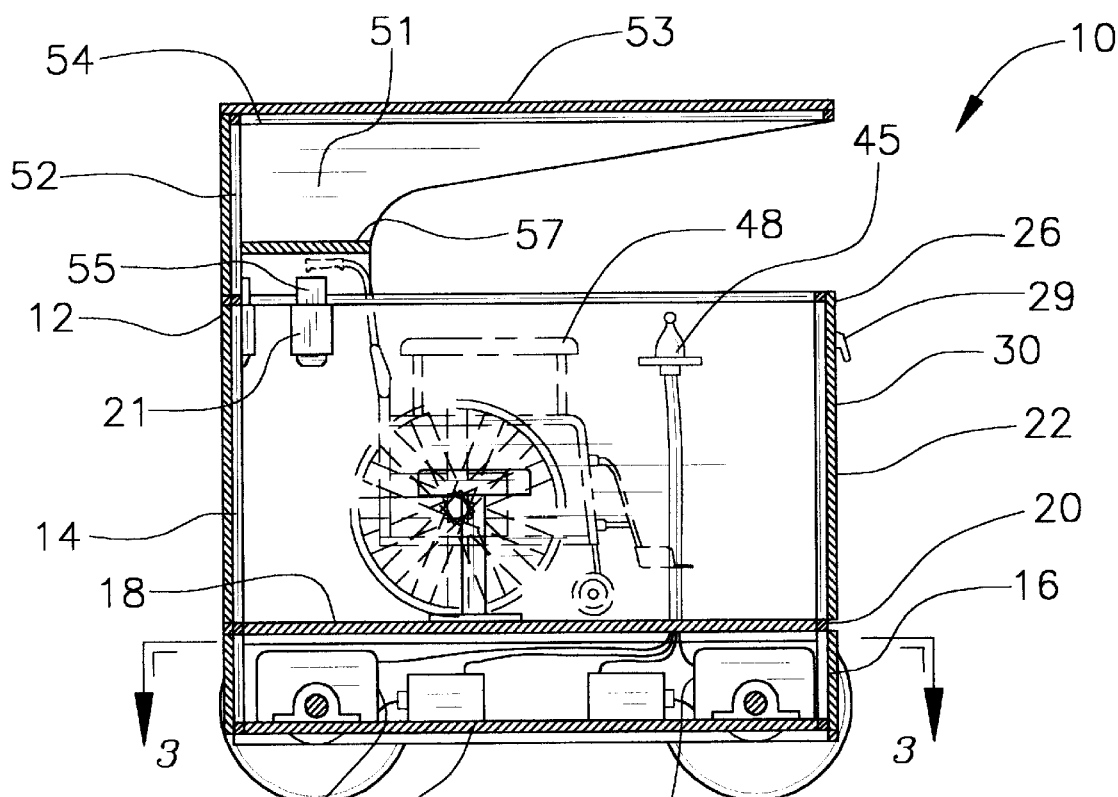
FIG. 2 is a schematic side cross-sectional view of the present invention.
Figure 3:
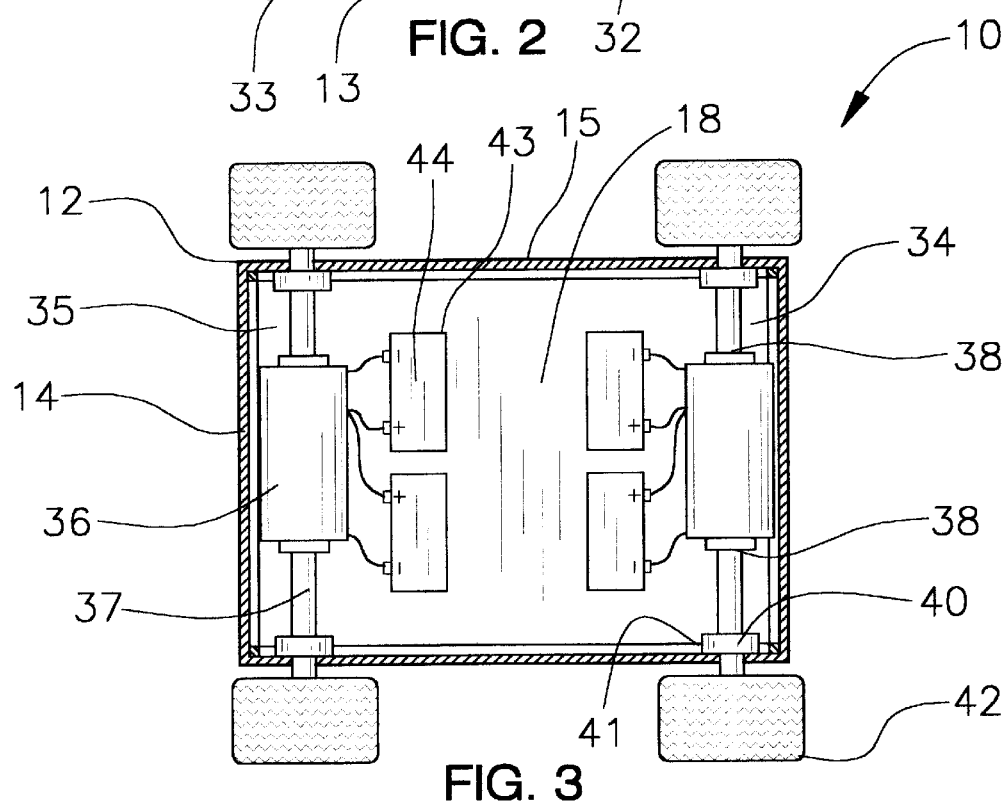
FIG. 3 is a schematic top cross-sectional view of the present invention.
Figure 4:
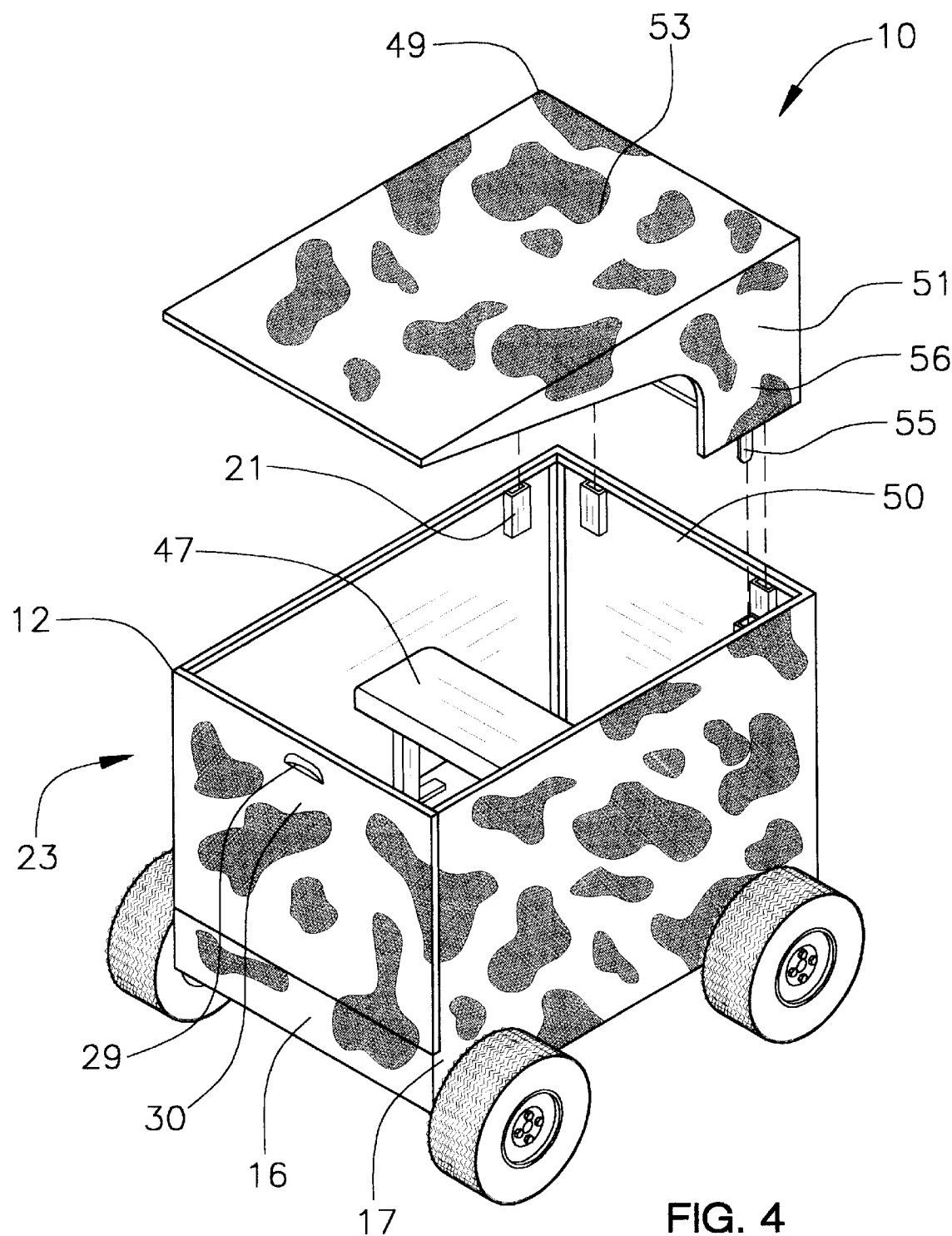
FIG. 4 is a schematic perspective view of the present invention depicting the attachment of the cover member.

With reference now to the drawings, and in particular to FIGS. 1 through 4 thereof, a new all-terrain vehicle embodying the principles and concepts of the present invention and generally designated by the reference numeral 10 will be described.

As best illustrated in FIGS. 1 through 4, the all-terrain vehicle 10 generally comprises a housing 12 that has a bottom wall 13, a back wall 14, and a pair of side walls 15 attached to and extending upwardly from the bottom wall 13.

A front panel 16 is attached to and extends between a lower portion 17 of each of the side walls 15.

A floor panel 18 is fixedly coupled to an inside surface 19 of the back wall 14, each of the side walls 15, and a top edge 20 of the front panel 16.

A plurality of bracket members 21 are fixedly coupled to the inside surfaces 19 of the back wall 14 and each of the side walls 15.

A door 22 is hingably coupled to the top edge 20 of the front panel 16. The door 22 is positionable between a raised position 23 and a lowered position 24. The door 22 abuts a front edge 25 of each of the side walls 15 when in the raised position 23. An upper edge 26 of the door 22 abuts a support surface 27 when in the lowered, position 24 such that the door 22 acts as a ramp 28 that extends upward to the floor panel 18.

A handle 29 is fixedly coupled to a front face 30 of the door 22. The handle 29 is positioned adjacent the upper edge 26 of the door 22.

A pair of linkage members 31 is attached to and extends between the housing 12 and the door 22 such that the user may move the door 22 from the lowered position 24 to the raised position 23.

A front drive system 32 and a rear drive system 33 for the purpose of propulsion are fixedly coupled to the bottom wall 13 and positioned adjacent front and rear sections 34, 35 of the bottom wall 13 respectively. Each of the drive systems 32, 33 includes:

An electric motor 36 that has drive shafts 37 rotatably coupled to and extend outward away from opposing ends 38 of the motor 36. Outer ends 39 of each of the drive shafts 37 extend through each of the side walls 15.

A pair of bearing members 40 for bearing loads on each of the drive shafts 37 is rotatably coupled to the drive shafts 37. Each of the bearing members 40 are positioned adjacent a juncture 41 of the bottom wall 13 and each of the side walls 15.

Wheels 42 are releasably attachable to the outer ends 39 of the drive shafts 37.

A power source 43 for powering the motor 36 is positioned adjacent the motor 36. The power source 43 is electrically coupled to the motor 36. The power source 43 comprises at least one battery 44.

An actuator 45 for controlling each of the motors 36 is mounted to the inside surface 19 of one of the side walls 15 such that the actuator 45 is accessible to the user. The actuator 45 is electrically coupled to the motor 36 and the power source 43. The actuator 45 comprises a multi-functional joystick 46 such that the user may control both speed and direction.

A seat 47 is removably attached to the floor panel 18 so that a wheelchair 48 may be rolled up the ramp 28 and onto the floor panel 18.

A cover member 49 is selectively couplable to the upper rear portion 50 of the housing 12. The cover member 49 has a pair of side panels 51, a rear panel 52, and a top panel 53. Each of the panels 51, 52, 53 is attached to an L-shaped support member 54. The top panel 53 is generally parallel to the floor when the cover member 49 is coupled to the housing 12.

A plurality of plates 55 is fixedly coupled to a lower section 56 of the cover member 49. One each of the plates 55 extends downward from each of the panels 51, 52, 53 of the cover member 49. Each of the plates 55 is releasably couplable to an associated one of the bracket members 21.

A shelf 57 is attached to and extends between each of the side panels 51 of the cover member 49. The shelf 57 is oriented generally parallel to the top panel 53.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An all-terrain vehicle for allowing users with limited physical capabilities to participate in off-road activities, said vehicle comprising:

a housing having a bottom wall, a back wall, and a pair of side walls attached to and extending upwardly from said bottom wall;

a front panel being attached to and extending between a lower portion of each of said side walls;

a floor panel being fixedly coupled to an inside surface of said back wall, each of said side walls, and a top edge of said front panel;

a plurality of bracket members being fixedly coupled to said inside surfaces of said back wall and each of said side walls;

a door being hingably coupled to said top edge of said front panel;

a handle being fixedly coupled to a front face of said door;

a pair of linkage members being attached to and extending between said housing and said door;

a front drive system and a rear drive system for the purpose of propulsion being fixedly coupled to said bottom wall and positioned adjacent front and rear sections of said bottom wall respectively;

a seat being releasably attachable to said floor;

a cover member being selectively couplable to said upper rear portion of said housing;

a plurality of plates being fixedly coupled to a lower section of said cover member;

said cover member having a pair of side panels, a rear panel, and a top panel, each of said panels being attached to an L-shaped support member; and a shelf being attached to and extending between each of said side panels of said cover member.

2. The all-terrain vehicle as set forth in claim 1, further comprising said door being positionable between a raised position and a lowered position, wherein said door abuts a front edge of each of said side walls when in said raised position, wherein an upper edge of said door abuts a support surface when in said lowered position such that said door acts as a ramp that extends upward to said floor panel.

3. The all-terrain vehicle as set forth in claim 2, further comprising said handle being positioned adjacent said upper edge of said door.

4. The all-terrain vehicle as set forth in claim 2, wherein the user may move said door from said lowered position to said raised position.

5. The all-terrain vehicle as set forth in claim 1, wherein each of said drive systems including an electric motor having a pair of drive shafts rotatably coupled to and extending outwardly away from opposing ends of said motor, outer ends of each of said drive shafts extending through each of said side walls.

6. The all-terrain vehicle as set forth in claim 5, wherein each of said drive systems including a pair of bearing members for bearing loads on each of said drive shafts being rotatably coupled to said drive shafts.

7. The all-terrain vehicle as set forth in claim 6, wherein each of said drive systems including each of said bearing members being positioned adjacent a juncture of said bottom wall and each of said side walls.

8. The all-terrain vehicle as set forth in claim 5, wherein each of said drive systems including a pair of wheels being releasably attachable to said outer ends of said drive shafts.

9. The all-terrain vehicle as set forth in claim 5, wherein each of said drive systems including a power source for powering said motor being positioned adjacent said motor, said power source being electrically coupled to said motor.

10. The all-terrain vehicle as set forth in claim 9, wherein each of said drive systems including said power source comprising at least one battery.

11. The all-terrain vehicle as set forth in claim 8, wherein each of said drive systems including an actuator for controlling each of said motors being mounted to said inside surface of one of said side walls such that said actuator is accessible to the user, said actuator being electrically coupled to said motor and said power source.

12. The all-terrain vehicle as set forth in claim 10, wherein each of said drive systems including said actuator comprising a multi-functional joystick such that the user may control both speed and direction.

13. The all-terrain vehicle as set forth in claim 12, further comprising said top panel being generally parallel to said floor when said cover member is coupled to said housing.

14. The all-terrain vehicle as set forth in claim 12, further comprising one each of said plates extending downwardly from each of said panels of said cover member, each of said plates being releasably couplable to an associated one of said bracket members.

15. The all-terrain vehicle as set forth in claim 12, further comprising said shelf being oriented generally parallel to said top panel.

16. An all-terrain vehicle for allowing users with limited physical capabilities to participate in off-road activities, said vehicle comprising:

a housing having a bottom wall, a back wall, and a pair of side walls attached to and extending upwardly from said bottom wall;

a front panel being attached to and extending between a lower portion of each of said side walls;

a floor panel being fixedly coupled to an inside surface of said back wall, each of said side walls, and a top edge of said front panel;

a plurality of bracket members being fixedly coupled to said inside surfaces of said back wall and each of said side walls;

a door being hingably coupled to said top edge of said front panel, said door being positionable between a raised position and a lowered position, wherein said door abuts a front edge of each of said side walls when in said raised position, wherein an upper edge of said door abuts a support surface when in said lowered position such that said door acts as a ramp that extends upward to said floor panel;

a handle being fixedly coupled to a front face of said door, said handle being positioned adjacent said upper edge of said door;

a pair of linkage members being attached to and extending between said housing and said door such that the user may move said door from said lowered position to said raised position;

a front drive system and a rear drive system for the purpose of propulsion being fixedly coupled to said bottom wall and positioned adjacent front and rear sections of said bottom wall respectively, each of said drive systems comprising;

an electric motor having a pair of drive shafts rotatably coupled to and extending outwardly away from opposing ends of said motor, outer ends of each of said drive shafts extending through each of said side walls;

a pair of bearing members for bearing loads on each of said drive shafts being rotatably coupled to said drive shafts, each of said bearing members being positioned adjacent a juncture of said bottom wall and each of said side walls;

a pair of wheels being releasably attachable to said outer ends of said drive shafts;

a power source for powering said motor being positioned adjacent said motor, said power source being electrically coupled to said motor, said power source comprising at least one battery;

an actuator for controlling each of said motors being mounted to said inside surface of one of said side walls such that said actuator is accessible to the user, said actuator being electrically coupled to said motor and said power source, said actuator comprising a multi-functional joystick such that the user may control both speed and direction;

a seat being releasably attachable to said floor;

a cover member being selectively couplable to said upper rear portion of said housing, said cover member having a pair of side panels, a rear panel, and a top panel, each of said panels being attached to an L-shaped support member, said top panel being generally parallel to said floor when said cover member is coupled to said housing;

a plurality of plates being fixedly coupled to a lower section of said cover member, one each of said plates extending downwardly from each of said panels of said cover member, each of said plates being releasably couplable to an associated one of said bracket members;

a shelf being attached to and extending between each of said side panels of said cover member, said shelf being oriented generally parallel to said top panel.

\* \* \* \* \*